(12) United States Patent
Prieto, Jr.

(10) Patent No.: US 6,449,265 B1
(45) Date of Patent: Sep. 10, 2002

(54) MEDIA ACCESS CONTROL LAYER FOR SATELLITE ATM NETWORKS

(75) Inventor: Jaime L. Prieto, Jr., Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/232,157

(22) Filed: Jan. 15, 1999

(51) Int. Cl.⁷ .......................... H04L 12/28; H04L 12/56
(52) U.S. Cl. ................... 370/329; 370/349; 370/395.1; 370/469
(58) Field of Search ................................ 370/319, 321, 370/328, 329, 330, 343, 347, 349, 389, 395.1, 401, 436, 465, 469, 338; 709/227, 228, 230, 246, 249

(56) References Cited

U.S. PATENT DOCUMENTS

| | | | | |
|---|---|---|---|---|
| 5,638,371 A | * | 6/1997 | Raychaudhuri et al. | 370/347 |
| 5,774,461 A | * | 6/1998 | Hyden et al. | 370/329 |
| 5,787,080 A | * | 7/1998 | Hulyalkar et al. | 370/348 |
| 5,936,949 A | * | 8/1999 | Pasternak et al. | 370/328 |
| 5,953,328 A | * | 9/1999 | Kim et al. | 370/337 |
| 5,958,018 A | * | 9/1999 | Eng et al. | 709/246 |

OTHER PUBLICATIONS

Raychaudhuri, Dipankar, "Wireless ATM Networks: Architecture System Design and Prototyping," IEEE Personal Communications, Aug. 1996, pp. 42–49.

Tobagi, Fouad A., "Multiaccess Protocols in Packet Communication Systems," IEEE Transactions On Communications, vol. Com–28, No. 4, Apr. 1980, pp. 468–488.

Jacobs, Irwin Mark, et al. "General Purpose Packet Satellite Networks," Proceedings ofthe IEEE, vol. 66, No. 11, Nov. 1978, pp. 1448–1467.

Kleinrock, Leonard, et al. "Packet Switching in a Multi-access Broadcast Channel: Performance Evaluation," IEEE Transactions On Communications, vol. Com–23, No. 4, Apr. 1975, pp. 410–423.

* cited by examiner

Primary Examiner—Alpus H. Hsu
(74) Attorney, Agent, or Firm—Harness, Dickey & Pierce, P.L.C.

(57) ABSTRACT

A mapping scheme that maps standard ATMs service classes (28) of the type used in a wired communications network into one of a plurality of available media access control channels (30) that allow the particular ATM service class (28) to be transmitted efficiently over the network, such as a satellite network. The various media access controlled channel types (30) reside in a media access control layer (24) between the ATM layer (22) and the physical layer (26). A predetermined uplink user protocol is assigned to each MAC channel 30 to efficiently transmit to the ATM cells on the satellite uplink.

17 Claims, 4 Drawing Sheets

MEDIA ACCESS CONTROL LAYER FOR SATELLITE ATM NETWORKS

BACKGROUND OF THE INVENTION

1. Field of the Invention

This invention relates generally to a technique for mapping standard ATM service classes into a media access control channel and, more particularly, to a technique for mapping standard ATM service classes coded for wired transmissions into a media access control channel using a media access control layer in a wireless communications system, such as a satellite communications network.

2. Discussion of the Related Art

Various satellite communications systems, such as Ka-band satellite communications networks, make use of processing satellites orbiting the Earth in a geosynchronous orbit. As is known in the art, processing satellites provide the wireless transfer of data between user Earth terminals (UET) at ground stations on the Earth. Data is transmitted to the satellite from a source UET on a satellite uplink. The uplink signals are transmitted on channel slots that are separated in frequency and time. The data that is transmitted on the channel slots is typically separated or packaged into separate ATM (asynchronous transfer mode) data cells, as is well understood in the art. The ATM cells are demodulated, decoded and switched at the processing satellite, and then transmitted back to Earth on a satellite downlink to a destination UET. A suitable antenna system is provided on the satellite to receive the uplink signals and transmit the downlink signals over a predetermined coverage area on the Earth.

Terrestrial ATM switches used in the transfer of ATM data cells in wired ATM communications networks on the Earth are usually connected directly by point-to-point wires or fiber-optic cables. The data to be transmitted is configured into the ATM data cells in an ATM layer within the terminal processor. In most types of wired systems, the ATM data cells can be directly transmitted by what is referred to in the art as the physical layer. The physical layer is the data transmission mechanism, such as a modem, that converts digital bits to an analog waveform for transmission over a wire, fiber or a satellite (i.e., transferred between the terminals). Additional processing may be required in the physical layer for a broadcast medium that uses some form of multiple access control, such as multi-frequency time-division multiple access (MF-TDMA), in the physical layer. A discussion of wireless ATM network protocol stacks can be found in Raychaudhuri, Dipankar, "Wireless ATM Networks: Architecture System Design and Prototyping,"0 IEEE Personal Communications, August 1996, pgs 42–49.

For wireless communications networks, such as satellite communications networks, a media access control (MAC) layer is required between the ATM layer and the physical layer to satisfy the dynamic nature of the ATM protocol and the multi-media traffic it carries to provide additional processing between the ATM layer and the physical layer, because the ATM protocol was not originally designed to operate over a broadcast medium. For example, a different MAC channel may be required for the wireless transmission of the various ATM services classes, including information to gain access to the network (to sign on); signaling information to send up a call or connection (call routing); signaling information to tear down a call; signaling information to change the required configuration of a call; control information to configure the on-board payload of the satellite; ATM constant bit-rate (CBR) sources; ATM real-time variable bit-rate (rt-VBR) sources; ATM non-real time variable bit-rate (nrt-VBR) sources; ATM available bit-rate (ABR) sources; and ATM unspecified bit-rate (UBR) sources. The MAC layer allows the ATM layer to operate seamlessly over the satellite network. Currently, the use of MAC layers in commercial satellites do not exist.

The traffic characteristics of the different ATM service classes dictates the need for different multiple access protocols for efficient transport. For example, virtual private networks and web surfing applications will use the ABR or UBR service classes. In these examples, the traffic displays large peaks followed by periods of idle time; therefore this type of traffic requires some type of demand assigned multiple access (DAMA) protocol for efficient use of the bandwidth resource.

What is needed then is a strategy for mapping the standard ATM service classes in the ATM layer into one of a plurality of available MAC channels in the MAC layer that enables the ATM data cells to be efficiently transmitted over a satellite physical layer. It is therefore an objective of the present invention to provide such a mapping scheme.

SUMMARY OF THE INVENTION

In accordance with the teachings of the present invention, a mapping scheme is disclosed that maps standard ATM service classes of the type used in a wired communications network into one of a plurality of available media access control channels that allows the particular ATM protocol to be transmitted efficiently over a wireless communications system, such as a satellite network. The various media access control channel types reside in a media access control layer between the ATM layer and the physical layer. A predetermined uplink user protocol is assigned to each MAC channel to efficiently transmit the ATM cells on the satellite uplink.

The available media access control channel types in the media access control layer include network access channels (NAC), dedicated channels (DC), time dedicated channels (TDC), fair broadband shared data channels (FB-SDC), shared reservation channels, first-come first-served shared data channels (FCFS-SDC), and narrowband shared data channels (N-SDC). The particular transmission protocol for each MAC channel is selected from a slotted aloha protocol, a fixed channel-slot assignment protocol, a finite-duration fixed channel-slot assignment protocol, a centralized broadband fair demand assigned multiple access protocol, a centralized demand assigned multiple access protocol and a distributed demand assigned multiple access protocol.

Additional objects, advantages, and features of the present invention will become apparent in the following description and appended claims, taken in conjunction with the accompanying drawings.

DETAILED DESCRIPTION OF THE PREFERRED EMBODIMENT

The following discussion of the preferred embodiments directed to a technique for mapping standard ATM service classes into MAC channels in a wireless communications system is merely exemplary in nature, and is in no way intended to limit the invention or its applications or uses. For example, the discussion below concerns an ATM mapping technique for use in connection with a satellite communications network. However, the technique of the invention can be used with other types of communications systems and protocols, including terrestrial wired, wireless communications networks, and Internet Protocols (IP).

Figure 1:
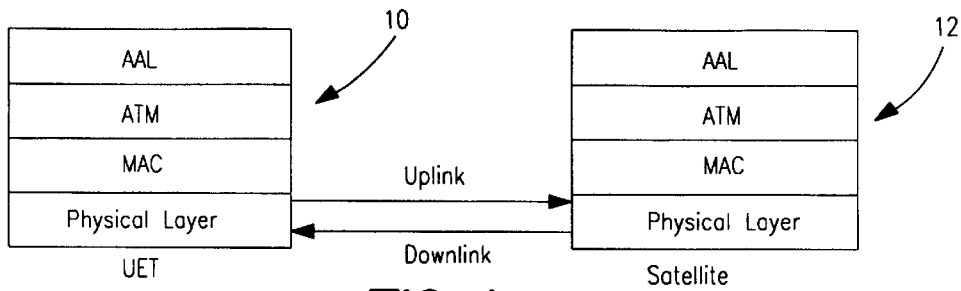
FIG. 1 is a block diagram of an ATM layered structure for a user Earth terminal (UET) and a satellite.

The hierarchical data transfer layers within an UET 10 and a satellite processor 12 on a satellite is represented in FIG. 1. The ATM adaptation layer (AAL) layer converts user application data, such as voice, video or web surfing, into a standard format readable by the ATM layer. This data input is converted into the ATM cells in the ATM layer, and depending on the transmission requirements, a particular MAC channel in the MAC layer is used to translate the ATM cells for transmission over the physical layer of the UET 10 on the satellite uplink or transmitted to the UET 12 on the satellite downlink.

The MAC layer essentially includes MAC channels that satisfy different network functional and performance requirements for a particular channel. MAC channels are logical constructs for partitioning the physical layer bandwidth into simplex pipes; a different MAC channel is needed for each direction of transmission. In general, the return or downlink MAC from satellite to UET is a broadcast to all terminals in a beam and are differentiated by packet header addressing. All downlink channels use the broadcast addressed statistical TDM protocol. Therefore, the discussion below will focus on the uplink MAC channel definition. Each MAC channel utilizes a certain protocol depending on the information to be transferred. The MAC layer maintains logical state information based on the state of the physical layer and the state and requirements of the ATM connection, for example, waiting for a connection request acknowledgement for a real-time VBR source, to determine the type of MAC channel to be used for the data transfer. The MAC layer sends configuration commands to the physical layer, including information related to the time, frequency band, and duration of the information transfer.

Figure 2:
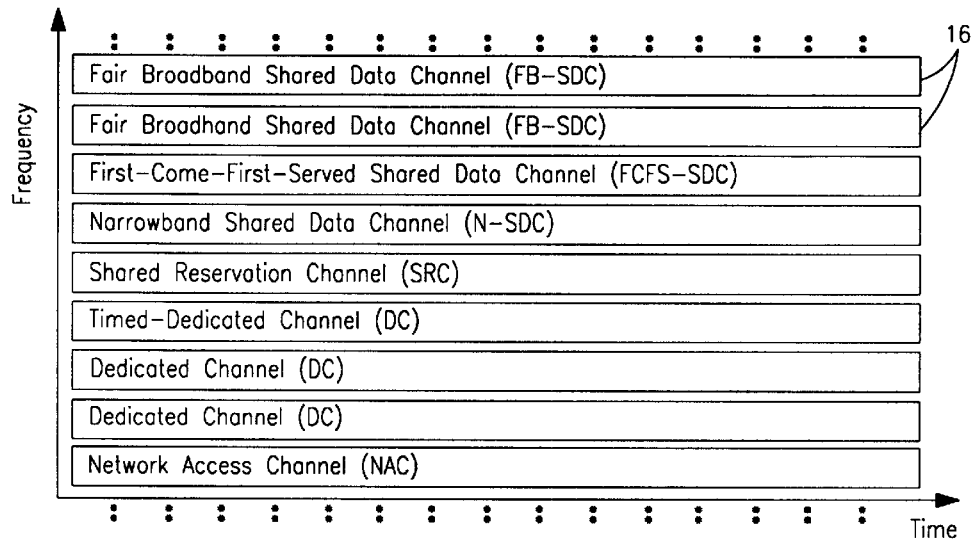
FIG. 2 is a graph with frequency on the vertical axis and time on the horizontal axis depicting several MAC channels.

A satellite communications network is generally controlled by a network operations center (NOC) that controls the flow of data between the UETs on the satellite uplink and downlink, and assigns an available transmission resource (TR) to a particular user of the network that wishes to send data at any particular time. A TR is a group of channel slots separated in frequency and time. FIG. 2 is a graph with frequency on the vertical axis and time on the horizontal axis showing a number TRs, identified as separate channel bandwidths 16 available to transmit information. Each channel bandwidth 16 includes separations in time represented by dotted lines to separate each frequency bandwidth into different time sections. Each channel bandwidth 16 represents a MAC channel allocated by the NOC that will be transmitted, using a frequency division multiplexing time-division multiple access (FDM-TDMA), on the satellite uplink. The MAC channel identifies the bandwidth available for transmission of the ATM cells, how long the bandwidth is available, and if the bandwidth will be shared with other users during that time.

Each channel bandwidth 16 is identified by a particular type of MAC channel, but as will be appreciated by those skilled in the art, each communications network will assign the various channel slots differently for different applications, and may rearrange the various channel slots for different MAC channels over time. A frequency band is not restricted to being a single MAC channel type. Different slots within a frequency band can be different MAC channel types. A network access channel (NAC) identifies the channel slot(s) used to contact the NOC for use of the network. The NAC is used by the UET when trying to gain access to the network through the NOC for the first time. According to the invention, the NOC responds to the UET and directs the UET to use either a dedicated channel (DC), a time-dedicated channel (TDC), a fair broadband shared data channel (FB-SDC), a first-come first-served shared data channel (FCFS-SDC), a narrowband shared data channel (N-SDC) or a shared channel (SC) based on the current user needs and the data to be transmitted. The DC is typically used for applications requiring a constant service rate, such as voice conversation or video transmission, for the duration of the connection. The TDC is typically used when a fixed-rate circuit is desired for an apriori finite period of time. The FB-SDC is typically used for high-rate, large application messages for customers concerned with getting a fair allocation of bandwidth and a guaranteed or bounded Quality of Service (QoS). The FCFS-SDC is typically used for high-rate, large application messages for customers who do not care about QoS (called "Best-effort"), and who want to minimize service costs. The N-SDC is typically used for small data messages, and narrowband bursty sources, such as small web requests. In general, SCs are used when the traffic contract specifies a bursty non-real time application, such as web-surfing or LAN interconnect. Before sending any of the information through the shared data channels, the UET must transmit a reservation request through a shared reservation channel (SRC), and receive a reservation confirmation.

Table 1 shows the ATM function or service class in the left side column, the MAC channel type used for that service class in the middle column and the uplink protocol used for that MAC channel in the right side column. The data may be coded in any one of the ATM service classes depending on the type of data and its application. Depending on which ATM service class is being used, the MAC layer will assign a particular MAC channel, as shown, and that MAC channel will use a particular user uplink protocol for efficient operation. Although not shown in Table 1, the downlink MAC protocol for all MAC channels is a broadcast-addressed statistical time-division multiplexing (BAS-TDM) protocol.

Particularly, for an out-of-band signaling or network control message ATM service class, the NOC will assign a network access channel (or a N-SDC) in the MAC layer, which uses a Slotted Aloha for the uplink protocol (which uses a centralized or distributed DAMA protocol). For a constant bit rate (CBR) or real-time variable bit rate (rt-VBR) ATM service class, the NOC will assign a dedicated channel in the MAC layer, which uses a fixed channel-slot assignment protocol for the uplink to the satellite. For the non real-time variable bit rate (nrt-VBR) service class, the NOC will assign a time-dedicated channel in the MAC layer, which uses a finite-duration fixed channel-slot assignment uplink protocol. For the available bit rate (ABR) or the unspecified bit rate plus (UBR+), the NOC will assign one of either the FB-SDC or the SRC in the MAC layer, where the FB-STC uses the centralized broadband fair DAMA uplink protocol and the SRC uses the Slotted Aloha uplink protocol. The UBR+is a UBR with a minimum bandwidth guarantee. For the unspecified bit-rate (UBR) ATM service class, the NOC would determine one of the three FCFS-SDC, N-SDC or SRC MAC channel-type depending on the particular user application and the cost the user is willing to pay. For example, if it were a small amount of data to be transmitted, then the NOC would probably assign the N-SDC MAC channel-type. Likewise, if it was a large amount of data to be transferred, the NOC would probably assign both SRC and FCFS-SDC MAC channel types.

Figure 3:
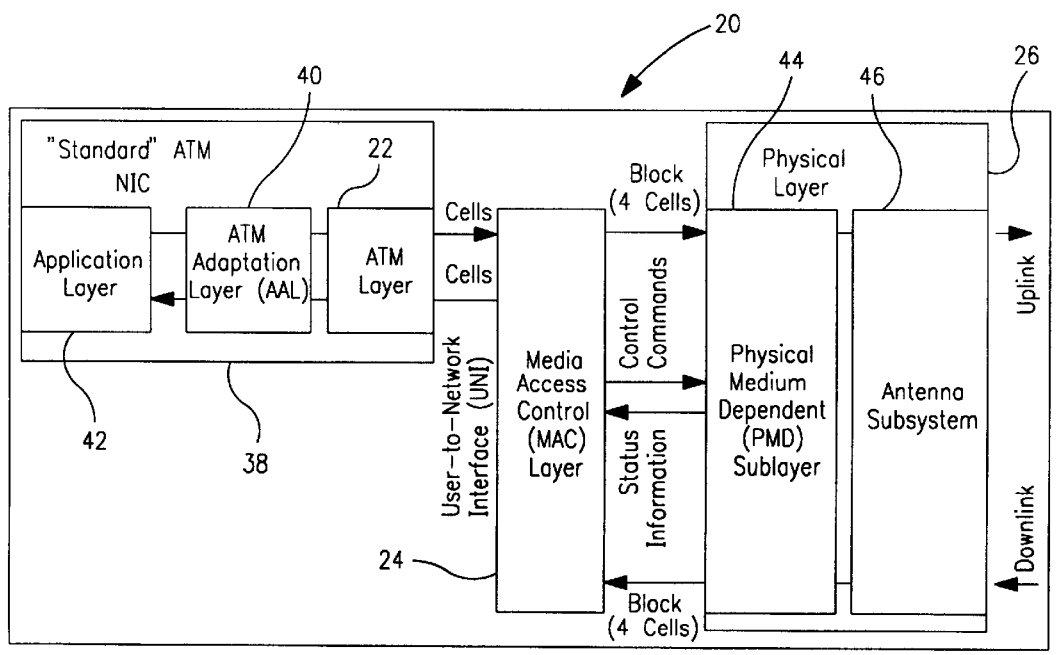
FIG. 3 is a high-level block diagram depicting the layered architecture within a UET, according to the present invention.

FIG. 3 is a block diagram depicting a layer architecture within a UET 20, according to the invention. The UET 20 includes a standard ATM Network Interface Card (NIC) 38 that includes an ATM layer 22, an AAL layer 40 and an application layer 42. The application layer 42 represents the particular user interface, such as voice recording, video, etc. The AAL layer 40 prepares the user data to be converted to a particular ATM service class in the ATM layer 22. Each one of the various service functions in the ATM layer 22 is satisfied by the ATM protocol. ATM NICS of this type are well-known in the art. A physical layer 26 includes a physical medium dependent (PMD) sublayer 44 where the particular ATM cells are grouped into blocks for error-control coding. Additionally, the physical layer 26 includes an antenna subsystem 46 for broadcasting the uplink signals

TABLE 1

| ATM Function or Service Class | MAC Channel Type | User Terminal Uplink MAC Protocol |
|---|---|---|
| Out-of-band Signaling, or network control messages | Network Access Channel (NAC) | Slotted Aloha |
| Constant Bit-Rate (CBR), or real-time Variable Bit-Rate (rt-VBR) | Dedicated Channel (DC) | Fixed Channel-Slot Assignment |
| Non Real-Time Variable Bit-Rate (nrt-VBR) | Timed-Dedicated Channel (TDC) | Finite-Duration Fixed Channel-Slot Assignment |
| Available Bit Rate (ABR), or Unspecified Bit Rate plus (UBR+) | Fair Broadband Shared Data Channel (FB-SDC) | Centralized Broadband Fair DAMA(C-BFD) |
| | Shared Reservation Channel (SRC) | Slotted Aloha |
| Unspecified Bit Rate (UBR) or signaling | First-Come First-Served Shared Data Channel (FCFS-SDC) | Centralized or Distributed DAMA |
| | or Narrowband Shared Data Channel (N-SDC) | Slotted Aloha |
| | Shared Reservation Channel (SRC) | Slotted Aloha |

The user protocol determines if or how the MAC channel will be shared with other users of the network. The particular MAC channel user protocols are identified by way of a non-limiting example, in that any efficient protocol for a particular MAC channel can be used. Slotted aloha is a known demand assigned multiple access (DAMA) protocol where multiple users share a common transmission resource, and complete for resource usage in a contentious manner. In the slotted aloha technique, any of the several users of the same TR would transmit data on the uplink whenever they desired. If a collision between two or more users on the transmission resource occurred (detected by a predetermined timeout), then each user would retransmit the data after a random time period to avoid another immediate collision. The fixed channel-slot assignment protocol is also a known uplink protocol that gives a user sole operation of the identified bandwidth. The finite-duration fixed channel slot assignment gives the user sole operation of the bandwidth for a limited period of time. The centralized broadband fair DAMA protocol is the subject of U.S. patent application Ser. No. 09/270,572 , titled "Onboard Control of Demand Assigned Multiple Access Protocol for Satellite ATM Networks," filed Mar. 16, 1999, and assigned to the assignee of this application. The distributed DAMA protocol is the subject of U.S. patent application Ser. No. 09/162,514, filed Sep. 29, 1998, titled "Distributed Control DAMA Protocol for Use with a Processing Communications Satellite,"0 and assigned to the assignee of this application.

and receiving the downlink signal on the transmission protocol, as would be well understood to those skilled in the art.

Figure 4:
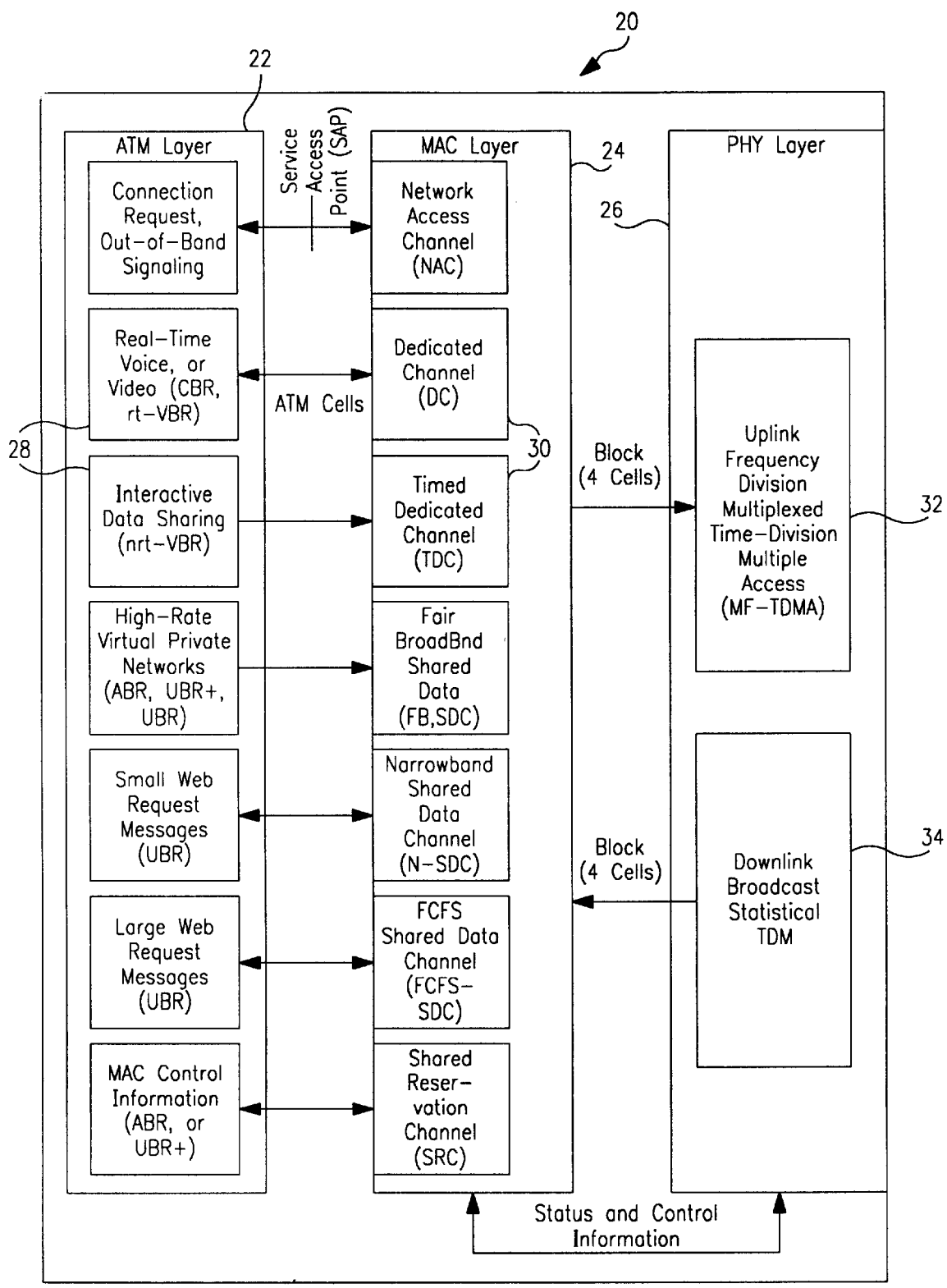
FIG. 4 is a block diagram depicting a layered architecture with example mappings between the ATM layer, application MAC channels and the physical layer within a UET, according to the present invention.

FIG. 4 is a block diagram of the UET 20 showing an example mapping of the MAC channels, and is a more graphic representation than that shown in Table 1 to depict the invention. The UET 20 includes the ATM layer 22, an MAC layer 24 and the physical layer 26. A plurality of ATM service classes and types 28 are represented in the ATM layer 22, and are directly mapped into a particular MAC channel 30 in the MAC layer 24. This also includes mapping from the MAC layer 24 to the ATM layer 22 for the downlink signals. For example, the ATM cells for real-time voice or video are mapped into a dedicated MAC channel because of the robust timing requirements of voice and video transmissions. The physical layer 26 shows the multiplexing scheme for the satellite uplink and downlink, particularly a frequency division multiplexed timed-division multiple access (FDM-TDMA) 32 for the uplink and a broadcast statistical TDM 34 for the downlink. This shows how the physical layer 26 is providing time and frequency division for the MAC channel types.

Figure 5:
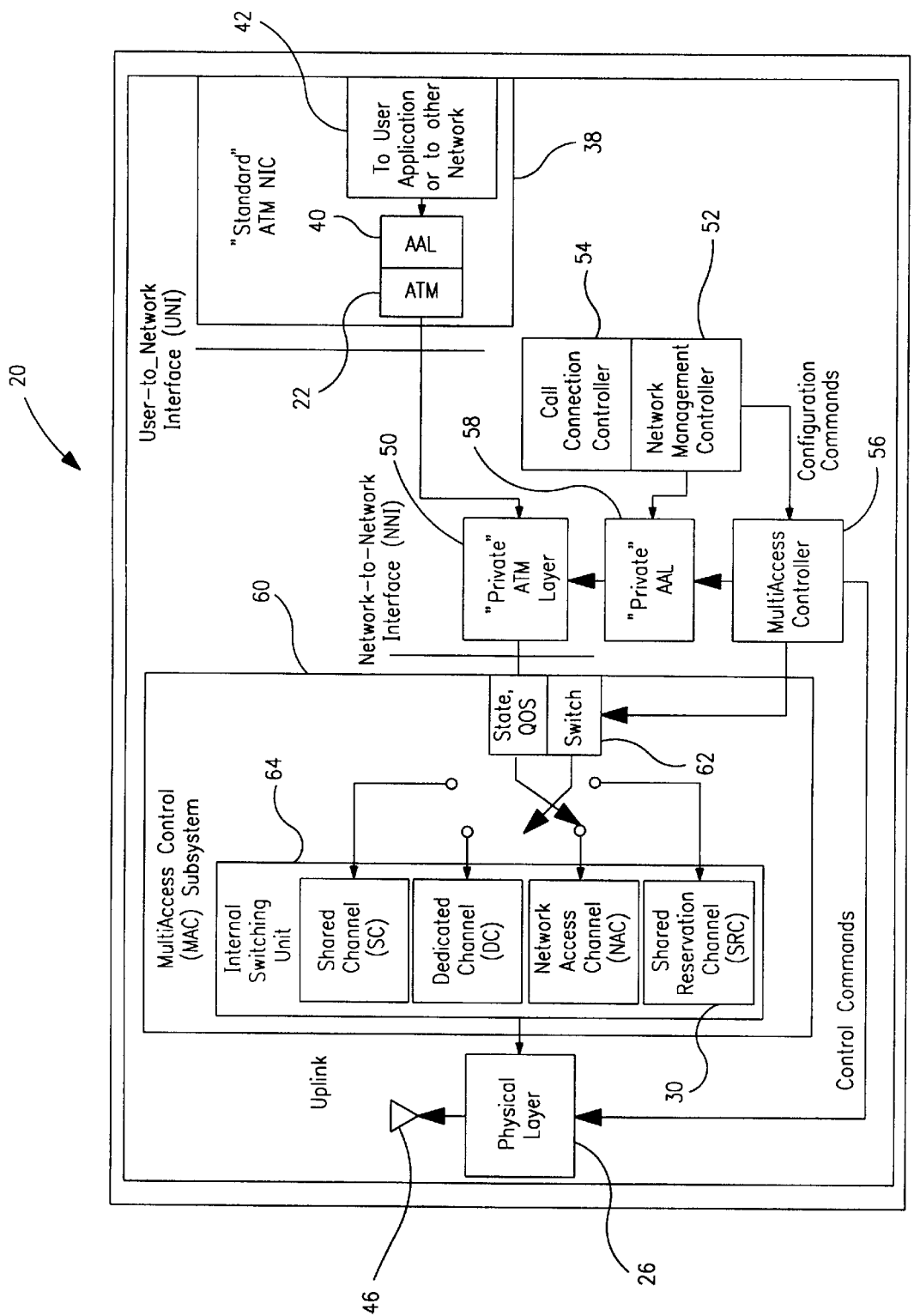
FIG. 5 is a functional block diagram depicting an MAC uplink sub-system for a user Earth terminal, according to the present invention.

FIG. 5 is another block diagram of the UET 20 showing the uplink operation of the MAC layer 24. The ATM layer 22 within the ATM NIC 38 sends the ATM cells to be transmitted on the uplink through the user-to-network interface to a private ATM layer 50 that performs address mapping. If a network management control function or a call connection function is to be uplinked, then a network management controller 52 or a call connection controller 54 generates the ATM cells, and sends the data to a multi-access controller 56 that controls the operation of the MAC layer 24. The controller 56 sends control commands to the physical layer 26. Additionally, the ATM cells from the network management control 52 are applied to a private AAL controller 58 to transfer the data to the private ATM layer 50. The ATM cells to be uplinked are then transferred through the network-to-network interface to a state switch 62 in a multi-access control subsystem 60. Depending on the addressing of the ATM cells, the switch 62 selects the appropriate MAC channel 30 within an internal switching unit 64 to appropriately map the ATM layer 22 to the desired MAC channel 30. The ATM cells are then transferred to the physical layer 26 to be broadcast by the satellite subsystem 46.

Figure 6:
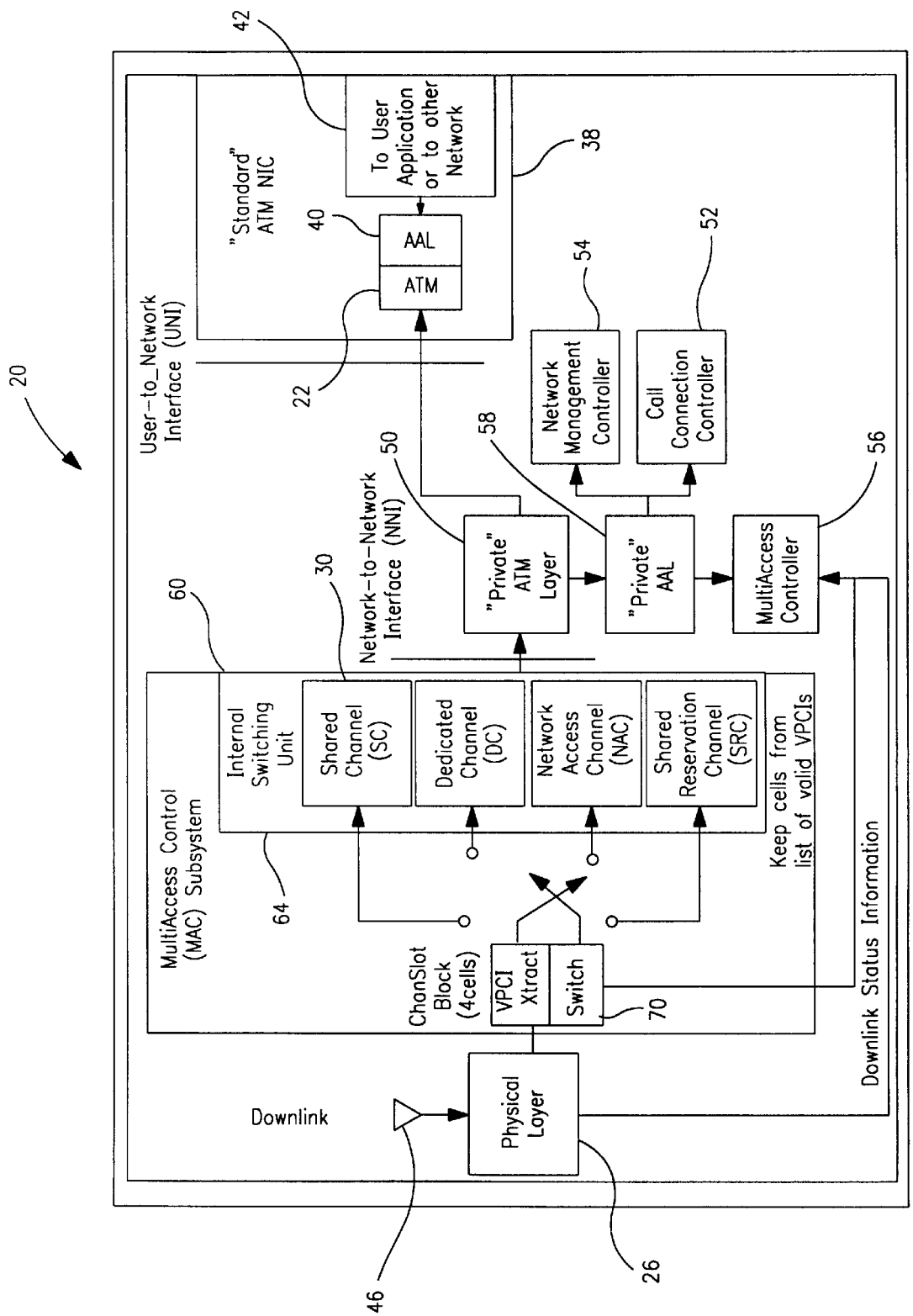
FIG. 6 is a functional block diagram depicting a MAC downlink sub-system for a user Earth terminal, according to the present invention.

FIG. 6 is the block diagram of the UET 20 depicted in FIG. 5 showing the downlink operation of the MAC layer 24. The antenna subsystem 46 receives the downlink signal and transfers it to the physical layer 26. The physical layer 26 transfers network status information to the multi-access controller 56. Additionally, the ATM cells from the physical layer 26 are applied to a VPCI extraction switch 70 within the multi-access control subsystem 60. The switch 70 selects a particular MAC channel 30 depending on the addressing in the ATM cells. Once the MAC channel type is selected, that particular MAC channel 30 sends the ATM cells to the private ATM layer 50 for address mapping. If the particular ATM cells are user data, then the private ATM layer 50 transfers the data to the ATM layer 22 in the ATM NIC 38 directly. If the ATM cells include signaling or control information for the MAC layer 24, then the private ATM layer 50 sends the ATM cells to the private ML 58. The private ML 58 determines whether it is a network management control function to be distributed to the network management controller 54 or a call connection function to be distributed to the call connection controller 52.

As discussed above, the invention provides a technique for transferring ATM cells in a wired terrestrial or ground based network to a wireless satellite communications system by mapping particular ATM service classes to a MAC channel based on user specified traffic characteristics. This technique has the advantages of enabling the ATM protocols to function seamlessly over a satellite network, to provide efficient usage of the satellite uplinks, to enable FDM channels to be dynamically reconfigured by the NOC to change MAC protocols, and to enable standard ATM end-to-end quality of service guarantees over a satellite network.

The foregoing discussion discloses and describes merely exemplary embodiments of the present invention. Ones skilled in the art will readily recognize from such discussion, and from the accompanying drawings and claims, that various changes, modifications and variations can be made therein without departing from the spirit and skill for the invention as defined in the following claims.

What is claimed is:

1. A method of transferring an ATM service class into a media access control channel in a wireless ATM communications network, comprising the steps of:

providing data to be transmitted;

coding the data into a predetermined ATM service class to transmit the data;

selecting a media access channel from a plurality of available media access channels, each media access channel being defined by a different channel slot in frequency and time that is usable by one or more users of the communications network, said selected media access channel being selected based on the predetermined ATM service class and selected from the group consisting of a network access channel, a dedicated channel, a time-dedicated channel, a fair broadband shared data channel, a shared reservation channel, a first-come first-served shared data channel, a narrowband shared data channel, and a shared reservation channel;

mapping the ATM coded data into the selected media access channel, including mapping an out-of-band signaling or network control message ATM service class into the network access channel, mapping a constant bit-rate or real-time variable bit-rate ATM service class into the dedicated channel, mapping a non real-time variable bit-rate ATM service class into the time-dedicated channel, mapping an available bit-rate or unspecified bit-rate plus ATM service class into one of either the fair broadband shared data channel or the shared reservation channel, and mapping an unspecified bit rate ATM service class into one of the first-come first-served shared data channel, narrowband shared data channel or shared reservation channel; and transmitting the data on the selected media channel using a predetermined transmission protocol, said transmission protocol being selected from a plurality of available transmission protocols where the selected transmission protocol is selected based on the selected media access channel.

2. The method according to claim 1 comprising the steps of selecting a Slotted Aloha protocol for the network access channel, the narrowband shared data channel and the shared reservation channel, selecting a fixed channel-slot assignment protocol for the dedicated channel, selecting a finite-duration fixed channel-slot assignment protocol for the time-dedicated channel, selecting a centralized broadband fair demand assigned multiple access protocol for the fair broadband shared data channel and selecting the centralized broadband fair demand assigned multiple access uplink protocol or a distributed demand assigned multiple access protocol for the first-come first-served shared data channel.

3. The method according to claim 1 wherein the step of selecting the transmission protocol includes selecting from the group consisting of a slotted aloha protocol, a fixed channel-slot assignment protocol, a finite-duration fixed channel-slot assignment protocol, a centralized broadband fair demand assigned multiple access protocol, and a distributed demand assigned multiple access protocol.

4. The method according to claim 1 wherein the ATM communications network is a satellite communications network, and the data is transmitted on a satellite uplink.

5. The method according to claim 4 further comprising the step of transmitting the satellite uplink using a frequency division multiplexing time-division multiple access.

6. The method according to claim 1 wherein the step of mapping the ATM data includes mapping the data in a media access control layer between an ATM layer and a physical layer.

7. The method according to claim 6 wherein the step of mapping the ATM data in the media access control layer includes using a switch that selects the media access channel.

8. A method of transferring an ATM service class into a media access control channel in a satellite communications network, comprising the steps of:

providing data to be transmitted;

coding the data into a predetermined ATM service class to transmit the data;

selecting a media access channel from a plurality of available media access channels, wherein each media access channel is defined by a different channel slot in frequency and time that is usable by one or more users on a satellite uplink of the communications network, said selected media access channel being selected based on the predetermined ATM service class;

mapping the ATM coded data into the selected media access channel that includes mapping an out-of-band signalling or network control message ATM service class into a network access channel, mapping a constant bit-rate or real-time variable bit-rate ATM service class into a dedicated channel, mapping a non real-time variable bit-rate ATM service class into a time-dedicated channel, mapping an available bit-rate or unspecified bit-rate plus ATM service class into one of either a fair broadband shared data channel or a shared reservation channel, and mapping an unspecified bit rate ATM service class into one of a first-come first-served share data channel, a narrowband shared data channel or a shared reservation channel; and transmitting the data on the selected media channel using a predetermined uplink protocol that is selected based on the selected media access channel, wherein the predetermined uplink protocol is selected from the group consisting of a slotted aloha protocol, a fixed channel-slot assignment protocol, a finite-duration fixed channel-slot assignment protocol, a centralized broadband fair demand assigned multiple access protocol, and a distributed demand assigned multiple access protocol.

9. The method according to claim 8 wherein the step of selecting the predetermined uplink protocol includes selecting the Slotted Aloha uplink protocol for the network access channel, the narrowband shared data channel and the shared reservation channel, selecting the fixed channel-slot assignment uplink protocol for the dedicated channel, selecting the finite-duration fixed channel-slot assignment protocol for the time-dedicated channel, selecting the centralized broadband fair demand assigned multiple access uplink protocol for the fair broadband shared data channel and selecting the centralized broadband fair demand assigned multiple access uplink protocol or the distributed demand assigned multiple access uplink protocol for the first-come first-served shared data channel.

10. The method according to claim 8 wherein the step of mapping the ATM data includes mapping the data in a media access control layer between an ATM layer and a physical layer.

11. The method according to claim 10 wherein the step of mapping the ATM data in the media access control layer includes using a switch that selects the media access channel.

12. The method according to claim 8 further comprising the step of transmitting the satellite uplink using a frequency division multiplexing time-division multiple access.

13. An architecture for a wireless satellite communications network said architecture including:

an ATM layer, said ATM layer including a plurality of ATM systems for coding data into a predetermined ATM service class;

a media access control layer, said media access control layer including a plurality of media access control channels, each media access channel being defined by a different channel slot in frequency and time that is usable by one or more users of the communications network, said media access control layer mapping the predetermined ATM service class to a certain media access control channel that is selected based on the predetermined ATM service class, where the selected media access channel is selected from the group consisting of a network access channel, a dedicated channel, a time-dedicated channel, a fair broadband shared data channel, a shared reservation channel, a first-come first-served shared data channel, a narrowband shared data channel, and a shared reservation channel, such that an out-of-band signaling or network control message ATM service class is mapped into the network access channel, a constant bit-rate or real-time variable bit-rate ATM service class is mapped into the dedicated channel, a non real-time variable bit-rate ATM service class is mapped into the time-dedicated channel, an available bit-rate or unspecified bit-rate plus ATM service class is mapped into one of either the fair broadband shared data channel or the shared reservation channel, and an unspecified bit rate ATM service class Is mapped into one of the first-come first-served shared data channel, narrowband shared data channel or shared reservation channel; and a physical layer, said physical layer transmitting the data on the selected media access channel using a predetermined uplink protocol selected based on the selected media access channel.

14. The architecture according to claim 13 wherein a Slotted Aloha uplink protocol is selected for the network access channel, the narrowband shared data channel and the shared resonation channel, a fixed channel-slot assignment uplink protocol is selected for the dedicated channel, a finite-duration fixed channel-slot assignment protocol is selected for the time-dedicated channel, a centralized broadband fair demand assigned multiple access uplink protocol is selected for the fair broadband shared data channel and the centralized broadband fair demand assigned multiple access uplink protocol or a distributed demand assigned multiple access uplink protocol is selected for the first-come first-served shared data channel.

15. The architecture according to claim 13 wherein the selected uplink protocol is selected from the group consisting of a slotted aloha protocol, a fixed channel-slot assignment protocol, a finite-duration fixed channel-slot assignment protocol, a centralized broadband fair demand assigned multiple access protocol, and a distributed demand assigned multiple access protocol.

16. The architecture according to claim 13 wherein the media access control layer includes a switch that selects the media access channel.

17. The architecture according to claim 13 wherein the physical layer transmits the ATM data on a satellite uplink using a frequency division multiplexing time-division multiple access.

* * * * *